Aug. 25, 1964   F. KOZIEN ETAL   3,146,050
PATCHING PANELS FOR ELECTRICAL INTERCONNECTIONS
Filed June 21, 1961   4 Sheets-Sheet 1
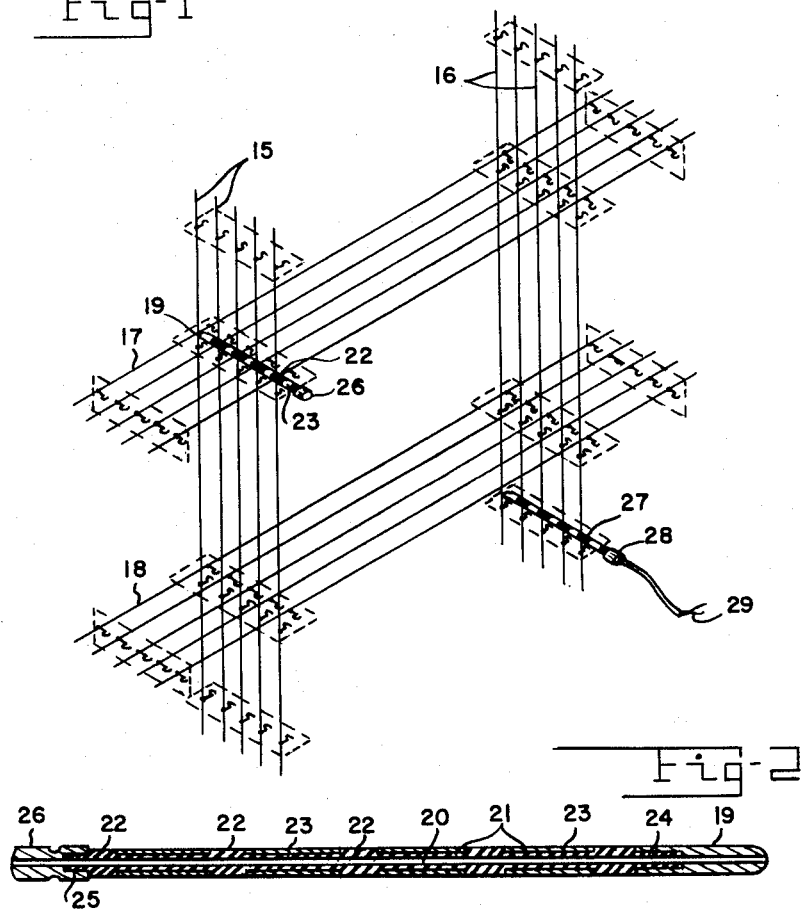
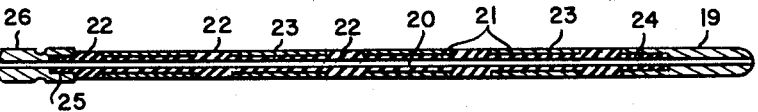
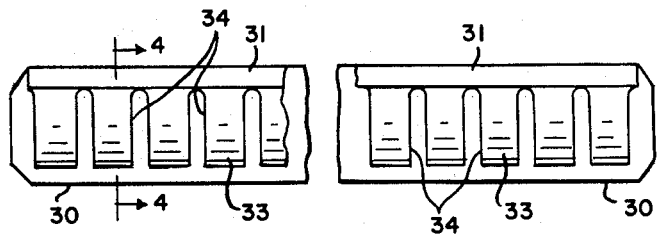
INVENTORS
FRANK KOZIEN, ALFRED F. SMITH,
JOHN A. THOMPSEN, ROYDEN F. ALLEN
BY
ATTORNEYS

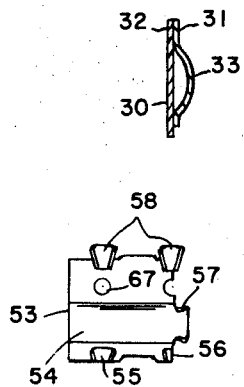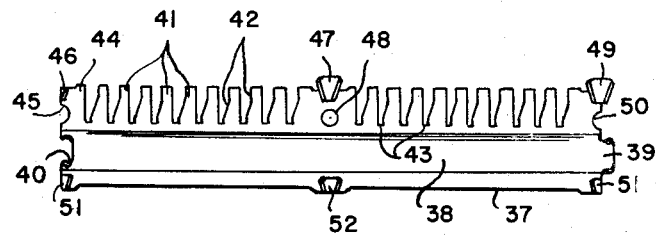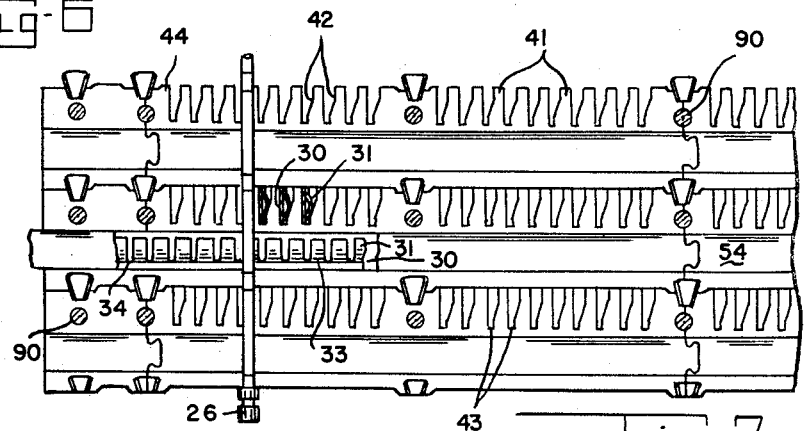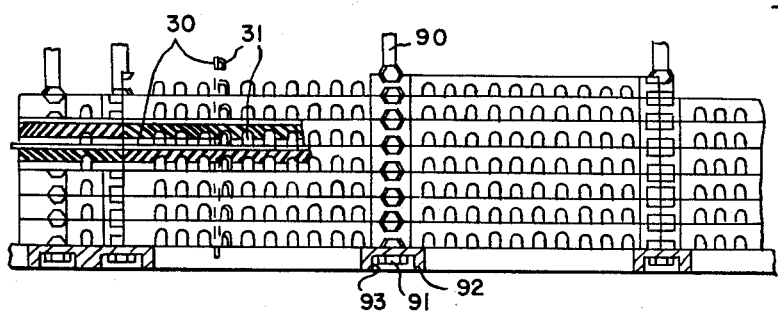

Aug. 25, 1964 F. KOZIEN ETAL 3,146,050
PATCHING PANELS FOR ELECTRICAL INTERCONNECTIONS
Filed June 21, 1961 4 Sheets-Sheet 4

INVENTORS
FRANK KOZIEN, ALFRED F. SMITH,
JOHN A. THOMPSEN, ROYDEN F. ALLEN
BY
ATTORNEYS

United States Patent Office 3,146,050
Patented Aug. 25, 1964

3,146,050
PATCHING PANELS FOR ELECTRICAL
INTERCONNECTIONS
Frank Kozien, Oriskany, N.Y., Alfred F. Smith, Eatontown, N.J., and John A. Thompsen and Royden F. Allen, Rome, N.Y., assignors to the United States of America as represented by the Secretary of the Air Force
Filed June 21, 1961, Ser. No. 118,745
1 Claim. (Cl. 339—18)
(Granted under Title 35, U.S. Code (1952), sec. 266)

The invention described herein may be manufactured and used by or for the United States Government for governmental purposes without payment to us of any royalty thereon.

The invention relates to a structurally and functionally improved electrical connecting assembly and more particularly, to a versatile patching panel.

A troublesome problem in all communication systems is that of the distribution of voice and control or supervisory circuits. In a communications central, the proper distribution of circuits to the subscribers being served by the central will involve many thousands of individual pairs or groups of wires. In common usage in fixed-plant communication are distribution frames whose sole purpose is to provide proper inside-to-outside distribution from common equipment frames to proper distribution cables serving the subscribers.

It is common practice today to utilize cross-connections on a semipermanently wired frame; each cross-connection consisting of a pair or more of wires soldered at one end to a terminal strip containing the inside terminations and then fastened at the other end to a terminal strip containing the outside terminations. For trouble shooting purposes, either conventional series or parallel connected jacks are wired into the circuit. These jacks are used for trouble shooting and occasionally cross-connections with the use of patch cords. It is necessary many times to vary the cross-connection plan either due to the trouble on the circuit, temporarily changes in the traffic, etc. This will usually result in a large number of patch cords in a very messy arrangement. A scheme such as this is also limited to a three-conductor circuit, the most that can be used using conventional components. Should it be desired to use circuits having over three conductors, it is necessary with conventional components to use double plugs, jacks and cords effectively doubling the size of the patch panel.

It is an object of this invention to provide a device which will occupy a minimum amount of space and by means of which an operator with only ordinary skills will be able to selectively and quickly connect any one of a given number of circuits or groups of circuits with other selected circuits.

It is another object of this invention to provide a patching panel which will conveniently comprise a number of conductor mounting and housing elements, each capable of being readily and economically manufactured and which elements will cooperate or interlock with each other to furnish a unitary assembly.

Other objects, novel features, and advantages of this invention will become apparent upon consideration of the embodiments illustrated in the accompanying drawings and hereinafter to be described.

In the drawings:

FIGURE 1 is a somewhat diagrammatic perspective view of the conductors embraced within one grouping of a connector panel and showing different types of pins disposed in operative relationship therewith;

FIGURE 2 is a sectional side view in enlarged scale of one form of pin which may be employed;

FIGURE 3 is a fragmentary face view of one form of conductor or ribbon which may be incorporated in the assembly;

FIGURE 4 is a transverse sectional view thereof taken along the line 4—4 in the direction of the arrows as indicated in FIGURE 3;

FIGURE 5 is a plan view of one of the elements forming a main part of the panel assembly and when combined with similar elements;

FIGURE 6 is a corresponding view of a unit of the panel ordinarily incorporated in the marginal zone thereof;

FIGURE 7 illustrates a number of combined units;

FIGURE 8 is a fragmentary, partly sectional front view of a panel assembly as shown in FIG. 7;

Figure 9:
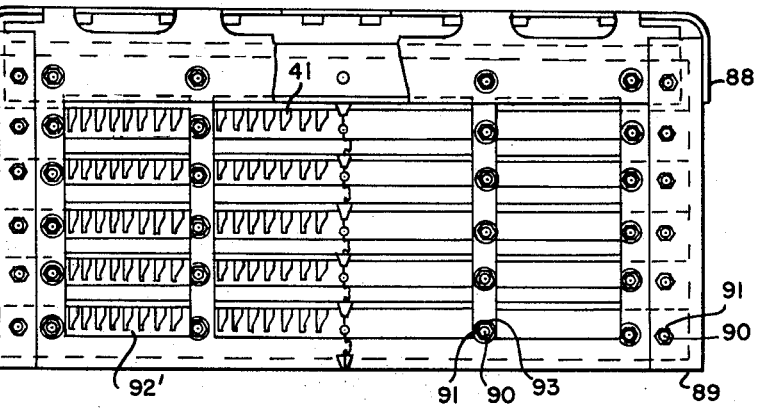
FIGURE 9 is a plan view of that assembly with certain of the parts broken away to disclose underlying constructions.

Referring primarily to FIGURE 1, there has been schematically illustrated an arrangement of conductors to be electrically interconnected. These conductors are subdivided into groups conveniently extending at right angles to each other and, under initial condition, free from electrical coupling or contact. For example, vertically extending groups of conductors, such as 15 and 16, may be provided and horizontal groups of conductors, such as 17 and 18, are also incorporated in the panel. Leads (not shown) are permanently connected to the conductor groups 15 to 18 and coupled to controlling or controlled circuits. An operator may establish a desired circuit grouping by, for example, coupling conductor group 15 with conductor group 17. This is achieved preferably by a pin which may readily be applied to or removed from the panel. Such a pin has been shown in detail in FIGURE 2.

In that view, the numeral 19 indicates the tip of a pin assembly conveniently formed of metal. What might be termed the base portion of the pin is preferably provided by a rod 20, again conveniently formed of a suitable metal. That rod mounts a sleeve 21 of insulating material and which may be enlarged to furnish collar portions 22 at predetermined, spaced points. Between these collar portions, sleeve 21 is encircled by tubular parts 23 also formed of metal and which are retained against axial displacement by abutting the collars 22. The sleeve 21 has an extended portion 24 which projects into the bore of tip 19 to mount the latter. Opposite the extended portion 24, sleeve 21 may provide a hub 25 projecting beyond the adjacent collar 22. An actuating knob 26 is conveniently coupled directly to the hub 25.

Figure 10:
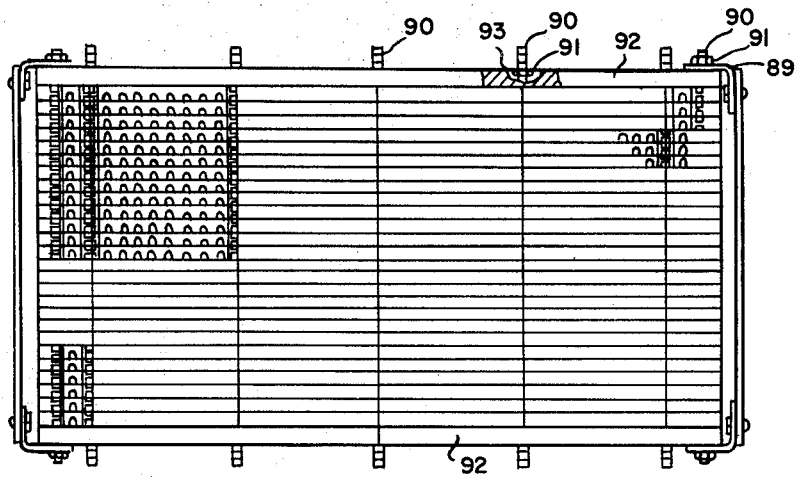
FIGURE 10 is a front view of a connector assembly.

Accordingly, the pin embraces a number of conducting portions electrically isolated from each other and corresponding for example, to the maximum number of conductors in any one group within the connector panel. With panels such as shown in FIGURES 9 and 10, forty by twenty units will be involved. This will embrace eight hundred jacking appearances and one hundred and twenty test jacks. The number of conductors per circuit may be increased by adding in depth suitable supporting structure and contact elements carried thereby. Of course, according to the number of conductors individual to each grouping, the number of conducting areas forming a part of a given pin will be varied. In other words, as shown in FIGURE 2, a greater or smaller number of conducting encircling portions 23 could be furnished. Variations of the basic pin may be used to perform various other desired functions.

Insofar as the conductors are concerned, they might take one of several forms. It will be assumed that in accordance with the preferred and illustrated embodiment, one conductor is individual to a given lead connected with the panel. Therefore, all zones of its body will be of a nature such that if contact is established at any given point, a current flow may occur through the entire conductor. Attention is invited to FIGURES 3 and 4 which show a conductor in the form of a ribbon. That type of construction will ordinarily be embodied in this element. The numeral 30 indicates a backing strip and 31 a conducting or contact layer. That layer is attached to strip 30 adjacent one edge zone of the elements, by for example, spot welding as indicated at 32. Layer 31 is bowed upwardly as indicated at 33, to incorporate resiliency in strip 31, its opposite edge zone being bowed downwardly and in sliding contact with strip 30 so that the contact portions provided by the bowed zone 33 are properly maintained throughout the life of the apparatus. Those contact portions are preferably individual to zones into which pins such as that shown in FIGURE 2 or indicated at 27, are projected. Therefore, slots 34 are provided in strip 31 to incorporate in the latter parts which might be termed contact tongues. Otherwise, the parts may be proportioned so that at least in certain of the jacking holes, the pin contacts parts of two succeeding teeth.

Figure 11:
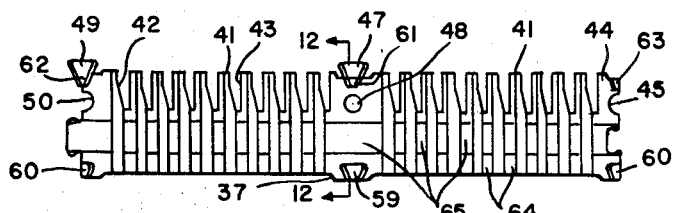
FIGURE 11 is a view similar to FIGURE 5, but showing the reverse face of the element.

According to the present teachings, the body in a panel embraces a series of individual elements formed of dielectric material so that the panel may readily be assembled on the basis of these elements and to include conductors as heretofore traversed. With such a preferred construction, an interlocking structure will exist between the several elements, such that the end result will embrace a unitary grouping of parts retained against movements with respect to each other and, in turn, retaining the conductors in proper positions. These elements may be termed barrier pieces. The structures embraced in each individual element on one of its faces has been shown in FIGURE 5, whereas that embraced on its opposite face is illustrated in FIGURE 11.

Referring primarily to the former figure, the reference numeral 37 indicates the body of the element or piece. This is formed of a suitable plastic incorporating insulating qualities. The body is relatively flat and furnishes on one face a groove extending from end to end. Groove 38 terminates in an extension 39 at one end of body 37 and this extension is preferably in the form of a wedge-shaped key portion. At its opposite end, the groove is interrupted to furnish a dovetailed recess 40. Along one of its edges, body 37 presents a series of projections or teeth 41 which are spaced from each other. It is preferred that these teeth, in one of their side edges at a point rearwardly of their outer ends, embrace angularly-extending surfaces 42 which terminate in edges extending perpendicular to the axis of body 37 to thus furnish reduced slot portions 43.

Adjacent this same edge, body 37 terminates at one end in an abutment 44 which presents part of a key recess 46 in its outer edge. Also this abutment presents a notch portion 45. At the opposite end of this edge, an abutment similar to abutment 44 is provided. This furnishes, as an integral part, a preferably wedge-shaped key portion 49 at its free end. At the base of part 49 and within the adjacent edge of the abutment, a notch 50 corresponding generally to notch 45 is provided.

In its lower edge, as viewed in FIG. 5, body 37 is furnished adjacent one end with a recess 51 corresponding generally to recess 46. A similar recess is furnished at the opposite end of this edge. At a point substantially midway of these ends, this edge is furnished with a recess 52 which has an undercut or key configuration. In line with recess 52 and in the upper edge of body 37, there is furnished a key-shaped extension 47. At a point spaced from the base of the latter, the body is furnished with a transversely extending opening 48, the diameter of which corresponds to the aggregate diameter defined by notches 45 and 50.

Figure 13:
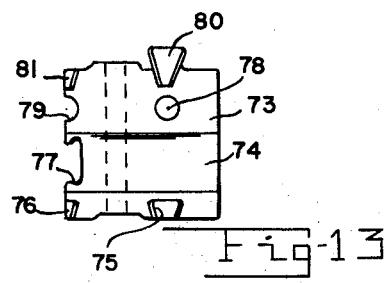
FIGURE 13 is a face view of an element disposed at that end of the assembly opposite the element of FIGURE 6.
Figure 14:
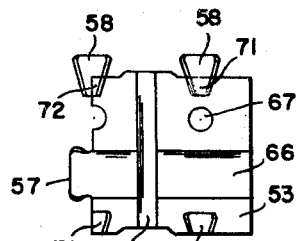
FIGURE 14 is a face view of the reverse surface of the element of FIGURE 6.
Figure 15:
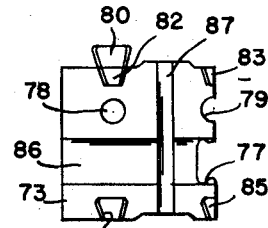
FIGURE 15 is a reverse view of the element of FIGURE 13.

The assembly of elements also includes barrier end pieces including structures such as are shown in FIGS. 6 and 13, in connection with what might be termed upper faces, and lower faces as shown in FIGS. 14 and 15. As illustrated in FIG. 6, the end piece will include a body 53, again preferably formed of plastic material having insulating properties. The face of this element, illustrated in that figure, will provide a groove 54. In its lower edge, as illustrated, a notch 55 will exist intermediate its end edges and this notch will include a base wall between its upper and lower faces. A notch portion, preferably having a key or retaining structure similarly to that embraced in recess 55, is also provided at 56 in the lower edge of this element. That portion, in conjunction with recess 51, furnishes a recess in aggregate corresponding to 55 and including also a base wall between the upper and lower faces of the body. A key extension 57 is furnished as an extension of the groove 54 and has an area such that it may be received within the recess 40. In the upper edge of body 53 as viewed in FIGURE 6, extensions 58 are provided. These are again of the key type and correspond to extensions such as 47 and 49.

Figure 12:
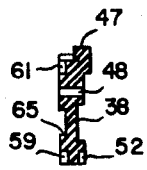
FIGURE 12 is a transverse sectional view along the line 12—12 in the direction of the arrows as indicated in FIGURE 11.

Now referring to FIGURE 11 which shows the reverse side of the barrier piece as illustrated in FIGURE 5, it will be seen (considering also FIGURE 12) that body 37, on the face opposite to that illustrated in FIGURE 5, provides in its lower edge at a point substantially midway of its ends a key type recess 59. That recess is in line with and corresponds to recess 52. In the same edge zone and adjacent the ends of element 37, partial recesses 60 are furnished. The latter recesses in aggregate present an outline corresponding to recess 59. In its upper edge and at a point substantially midway of its ends, in line with recess 59, body 37 is formed with a recess 61. This is in line with the base of extension 47. In this same edge, in line with extension 49, a recess 62 is provided at one end, while in the opposite end a recess 63 is formed which is in line with recess portion 46 and separated therefrom by the intervening base wall. Ribs 64 extend transversely of body 37 throughout the face shown in FIGURE 11. These ribs or fins are preferably in line with an edge zone of the teeth 41 although they may be otherwise disposed. These ribs are interrupted by notches 65 which are aligned with each other as well as with a notch portion formed in the central area of body 37.

Now referring to FIGURE 14 in which there has been illustrated the obverse side or face of the element shown in FIGURE 6, it will be noted in that face that a groove 66 is provided in line with the extension 57. The opening 67 extends above this groove and through the body of the element. A transverse groove 68 extends through from the upper to the lower edges of body 53 and is U-shaped in section. A notch 69 is furnished in this reverse face of the piece in line with notch 55 and separated therefrom by the base wall or partition. A partial notch 70 exists below the extension 57 and in line with notch 56; being again separated therefrom by the intervening wall portion. In its upper edge, body 53 is provided with a notch 71 in line with the base of that extension 58 which is intermediate the end edges of the body. A further partial notch 72 is provided in line with the base portion of the extension 58 adjacent the right hand edge of the piece as viewed in FIGURE 6.

Now referring to the end piece complementary to the end of body 37, opposite that end to which the piece shown in FIGURE 6 is applied, attention is directed to FIGURE 13. This illustrates what might be termed the left end element of a barrier set. It will include a body 73, again formed of a plastic having dielectric properties, and having a groove 74 extending from one side edge through to the other. In its lower edge, it may define a key type recess or notch 75 at a point intermediate its end edges. Adjacent the left hand end edge as viewed in this figure, a partial notch portion 76 is provided. Both the recesses 75 and 76 are furnished with base wall portions according to a preferred concept of the invention. A key type notch 77 is formed in body 73 in line with groove 74 and immediately above partial notch 76. An opening 78 extends transversely through the body and a semi-circular notch 79 is furnished in the end edge immediately above notch 77. In its upper edge, a key type projection 80 is formed at a point between the end or side edges. Above notch 79, a further notch 81 is provided common to the upper and adjacent side edge. This notch similarly to notches 75 and 76 is formed with a base wall.

The reverse face of the left end piece, as shown in FIGURE 13 is illustrated in FIGURE 15. In this view, it will be noted that body 73 is formed adjacent its upper edge with a receiving notch 82 in line with the base of projecting portion 80. Also it is formed with a partial notch 83 in line with and corresponding to notch 81. Additionally, notches 84 and 85 are provided respectively in line with notches 75 and 76 in its opposite face. These notches, in common with notch 83, are separated from the aligned notches by the base or partition portion forming an integral part of body 73. Extending across the face of body 73 is a groove 86, one end of which is in line with notch 77. Intersecting this groove is a channel or groove 87, extending from the top to the lower edge of piece 73 as shown in this figure. The groove 87 is preferably U-shaped in section. The end pieces illustrated in FIGS. 6, 13, 14 and 15, will have transverse sections corresponding substantially to that shown in FIGURE 12.

As shown especially in FIGURE 7, a number of the barrier pieces will be arranged with similar faces facing in the same direction. The elements being disposed in the same plane to provide a single layer, the projection 47 of one piece will extend into the notch 52 of an adjacent piece and interlock with the same. With similar barrier pieces arranged end-to-end, the projecting portion 39 of one will extend into the notch 40 of an adjacent piece. Likewise, the projection 49 will extend into the notch 46 or 51 of a barrier piece disposed adjacent the same. In the case of an end piece of the type shown in FIGURE 6, projecting portions 57 and 58 will extend respectively into notches 40 and 46. Notch portions 51 and 56 will provide, in aggregate, a part corresponding to recess 55. Thus, while the latter receives one of the projections 58 of an adjacent end piece, the notch 51–56 receives the other projection thereof. The openings furnished by the bores 48, 67 and 78 will all be aligned and the same will be true of the openings formed by arranging notches such as 45 and 50, 79, etc., adjacent each other.

Also, as shown in FIGURES 7 and 8, conductors comprising preferably a structure similar to that shown in FIGURES 3 and 4, are disposed one within each of grooves 38 with their contact strips 31 extending upwardly into the grooves 65 of an adjacent barrier piece. Such strips or ribbons will, as shown, be for example five in number, although obviously a greater or lesser number could be employed with a corresponding variation in the number of barrier pieces utilized. These conductors will lie in the same plane. Further conductor strips will extend vertically with respect to the axes of the first-named group of conductors. They will be disposed, one within each of the grooves 42–43 formed between the teeth 41. The free ends of the teeth defined between slots 34 will extend upwardly or, in other words, towards the point of maximum width of the spaces between the teeth 41. Under these circumstances, the barrier pieces as well as the end pieces will all be interlocked against accidental separation. By virtue of the pins or ribs 64, channels or bores are furnished within which a pin of the type shown in FIGURE 2 may be received and guided to a point where its head or knob arrests further projection. In such position, one of the contact tubes or sleeves 23 of the pin will electrically engage one of the contact portions of a conductor as well as a similar portion of a second conductor extending perpendicular with respect to the same.

In order to provide an assembly in which the several barrier pieces will be maintained in interlocked relationship, it is preferred to employ bolts or similar securing elements. These have been shown in FIGURES 8, 9 and 10. Referring especially to the two latter figures, an enclosing frame embracing end strips 88 may be employed and which mount bracket portions 89. The latter are formed with openings such that the ends of bolts 90 may extend through the same. These bolts also extend through openings such as 78 and 67 in the end pieces. Similar bolts extend through openings 48 in the barrier sections as well as openings or bores formed by a combining of notches 45, 50, and 79 and similar recesses complementary thereto. Plates 92 overlie an assembly of barrier and end pieces and are formed of any desired material and provide windows 92' for each of the conductor ribbon zones. They are additionally provided with openings through which the bolts may pass and have their outer faces recessed or countersunk, as indicated at 93 in FIGURE 10, to accommodate the adjacent nuts 91. In this manner, it is obvious that by tightening the nuts 91 or their equivalents, the several components in a single layer of the assembly are interlocked and the units over- and underlying that layer are drawn into intimate contact. Accordingly, the projections of elements in one layer will be snugly disposed within complementary receiving recesses of other layers so that, in effect, a single body portion is furnished with the conductors assembled therein. This will embrace drawing in a single layer parts such as 39, 45 and 57 into interlocking positions. Also, the several key extensions in superposed layers will be drawn into interlocking relationship with the recesses provided to receive them. This assures a proper alignment of jacking holes and ribbons throughout the assembly. As before brought out the conductors, by terminal portions 35 or otherwise, are connected to leads. One set of leads conveniently subdivided into groups corresponding in number to, for example, the horizontal conductor groups 17 and 18, may be common to the several horizontal conductors, with one lead provided for each conductor. A second set of leads similarly arranged may be connected to and common to the vertically extending conductor groups such as 15 and 16, with one lead for each conductor. Obviously leads might be connected to each of the opposite ends of an assembly as shown in FIGURES 3 and 4, or to different ends of different conductor ribbons or strips. With a view to avoiding unnecessary and confusing illustration, these leads have not been shown.

By using a three-dimensional concept, the area of panel is drastically reduced to a minimum and the use of cumbersome patch cords is eliminated in favor of a small size panel. In addition, with this new concept all connections are made at the patch panel for temporary connections and a cross-connection frame for permanent connections. By proper layout, the face panel of the equipment installation now becomes the traffic plan through the use of appropriate markings so that a separate drawing and record book is eliminated. Two large groups of circuits may be rapidly connected and disconnected completely at the election of the operator and by means of an apparatus occupying only a small amount of space. For example, according to apparatus of one size and embodying the present invention, two circuit groups are involved in a space of 19" x 8" in total area. These two circuit groups will involve 100 by 50, respectively, within that area and incorporate 5,000 connecting or patching possibilities. The increase in the number of conductors per circuit is accomplished by adding in depth to the assembly contact elements and their supporting structures involving barrier elements as heretofore described. Each form of the main elements, as shown in FIGURE 5, will embrace grooves or holes which will be twenty in number, a lengthwise groove for a horizontally extended conductor such as a contact ribbon, and twenty slots to receive vertical conductors also in the form of ribbons.

The elements of the assembly involve structures which mate with other identical elements. Therefore, a conductor supporting structure is provided that is adequate and which will properly receive the jack pins. These openings will never be misaligned. The elements are supported by rods or bolts adjacent their midpoints and ends. At these ends a new zero point is provided; the projections and recesses of the different elements cooperate in a manner such that an interlocking action occurs to maintain in the assembly the alignment of the ribbon channels and the jacking holes or openings.

When a pin is inserted in one of the series of electrically insulated and isolated conducting bores, a horizontal ribbon is connected with its adjacent vertical ribbon, thereby performing the desired connecting operation. This results in a proper connection between an individual conductor of one group with a corresponding conductor of a second group of circuits. Multiple connections of various kinds can be performed by lengthening their receiving bores to accommodate the special pins, or with the same length of bore, employing pins having conductive parts of different designs. In all instances the pins maintain their position by friction only.

The end pieces, as in FIGURE 6, close off the ends of the assemblies provided by utilizing barrier elements as in FIGURE 5. In these end pieces, only the horizontal conductors are present. The vertical conductors do not extend into the end pieces. Therefore, in these end pieces, one jacking hole gives access for testing by means of a wired patch pin of the type shown in FIGURE 1. If a pair of interconnected wire pins of this type are provided, a structure is furnished which will interconnect patch panels upon the pins being inserted into the selected openings thereof. Pins of this type may also be employed to provide interconnections with a single patch panel.

The testing of vertical conductors is provided for by the extra rows of barrier elements provided at the top and bottom of a given panel. These exclude the horizontal conductors and contain only the vertical ribbons. With a panel involving 5,000 possibilities, a structure is presented embracing 50 horizontal ribbon test jacks at the left and right sides of the panel and 100 each at the top and bottom. The latter will extend horizontally and embrace the vertical ribbon as before brought out. It is, of course, obvious that in a complete assembly, the four corner zones may be completely inoperative.

The contact surfaces of the pin illustrated in FIGURE 2 are preferably silver and rhodium plated. All of the barrier elements of the panel are preferably formed of molded thermoplastic block. Obviously, instead of five conductors being involved in a group, a greater or lesser number might be involved. Where the latter is the case, a much shorter patch pin of reduced diameter may be employed. This will increase the number of holes per square inch. The face of the panel will present only the projecting head or manipulating portions of pins disposed within the opening.

The invention is not intended to be limited to the examples of embodiment shown and described but, may on the contrary, be capable of many modifications without departing from the spirit of the invention.

We claim:

A connecting panel including in combination a plurality of superposed dielectric elements meeting in face-to-face contact, a projection extending vertically from the upper surface of each of said elements, each of said elements having a recess extending into its lower surface, said recess being engaged frictionally by the vertical projection of one of said elements beneath it to form a mechanical lock fitting together adjacent ones of superposed elements, each of said elements having its upper surface recessed so as to form a rectangular electrical conductor-receiving groove and having on one side of said groove plural spaced projections providing electrical conductor-receiving spaces therebetween, and each of said elements having in a plane below the groove therein a plurality of apertures equal in number to said conductor receiving spaces and into which a connecting plug may be inserted to establish an electrical link between an electrical conductor occupying said groove and an electrical conductor occupying any one of said conductor-receiving spaces, and said groove terminating at one end in a wedge-shaped extension and at the opposite end in a dovetailed recess whereby when said elements are arranged in an end-to-end relationship said extension grips into said recess thereby permitting horizontal development of said elements from either end in addition to said superposed vertical relationship.

References Cited in the file of this patent

UNITED STATES PATENTS

| | | |
|---|---|---|
| 1,097,220 | Glunt | May 19, 1914 |
| 2,107,158 | Lewis | Feb. 1, 1938 |
| 2,133,789 | Pool | Oct. 18, 1938 |
| 2,226,725 | Klenk | Dec. 31, 1940 |
| 2,558,008 | Smith | June 26, 1951 |
| 2,742,535 | Blackhall | Apr. 17, 1956 |
| 2,781,501 | McCroskey | Feb. 12, 1957 |
| 2,903,671 | Dreher et al. | Sept. 8, 1959 |

FOREIGN PATENTS

| | | |
|---|---|---|
| 108,721 | Sweden | Oct. 12, 1943 |